United States Patent
Abramczyk et al.

(10) Patent No.: US 6,758,516 B1
(45) Date of Patent: Jul. 6, 2004

(54) AUTOMOTIVE VEHICLE WITH ENHANCED LATERAL COLLISION INTRUSION RESISTANCE

(75) Inventors: Joseph Edward Abramczyk, Farmington Hills, MI (US); Karthik Chitoor, Canton, MI (US); Paul Culbertson, Farmington Hills, MI (US); Zheng James Peng, Ypsilanti, MI (US); Sandeep Kumar Gupta, West Bloomfied, MI (US); Eric Layton Stratten, Plymouth, MI (US); Herbert Yang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/250,214

(22) Filed: Jun. 13, 2003

(51) Int. Cl.$^7$ ............................................... B62D 25/22
(52) U.S. Cl. ......................... 296/187.12; 296/193.05; 296/203.03; 296/209
(58) Field of Search ..................... 296/187.03, 187.08, 296/187.12, 193.05, 193.07, 199, 203.03, 209

(56) References Cited

U.S. PATENT DOCUMENTS

| | | | | |
|---|---|---|---|---|
| 5,700,049 A | * | 12/1997 | Shibata | 296/203.03 |
| 6,422,631 B1 | * | 7/2002 | Schmidt et al. | 296/187.03 |
| 6,676,200 B1 | * | 1/2004 | Peng | 296/187.08 |

* cited by examiner

*Primary Examiner*—Jason Morrow
(74) *Attorney, Agent, or Firm*—Gigette M. Bejin

(57) ABSTRACT

An automobile includes a door, inner and outer rocker panels, and a floor pan joined to the inner rocker panel. A structural frame extends under the body. A frame standoff member is mounted to the inner rocker panel and extends inboard to a frame rail. The frame standoff member is separated from the frame rail by a clearance gap. Once the gap is closed due to lateral deformation of the door, rocker panels, and floor pan, the frame standoff member will resist further deformation of the door and rocker panels without dynamically coupling the door or rocker panels to the frame rail during normal operation of the vehicle.

15 Claims, 4 Drawing Sheets

AUTOMOTIVE VEHICLE WITH ENHANCED LATERAL COLLISION INTRUSION RESISTANCE

BACKGROUND OF INVENTION

1. Field of the Invention

The present invention relates to an automobile having enhanced resistance to laterally directed impacts.

2. Disclosure Information

Destructive testing of automotive vehicles typically includes the imposition of dynamic loading to the vehicle bodysides, typically in the form of a pendulum strike on the bodyside, or by crash testing. Such testing, in either form, imposes severe loading on the structural members of the body, particularly the door, B-pillar, and rocker panel assemblies. As testing requirements become more stringent, management of impact energy to reduce the intrusion of a barrier into the passenger compartment becomes even more difficult. In the case of separate frame and body vehicles, the resistance of the body to lateral intrusion may be enhanced if the frame rails, which have great strength in a lateral bending mode, could be coupled to the rocker panels and overlying closure panels. Unfortunately, dynamic coupling of the rocker panel, B-pillar, and closure structures with the frame may create an undesirable noise and vibration path between the frame rail and the balance of the body structure during normal operation.

The inventors of the present structural system have determined that the ability of an automotive body to manage laterally directed impact loads will be enhanced with the addition of the frame standoff member described herein, without adversely affecting the vehicle's interior noise and vibration signature. The present frame standoff device allows the vehicle's body to react in a more controlled manner against laterally imposed loads, and at an earlier time during a crash sequence, because deformation of the body's doors, B-pillar, and rocker panel will be resisted by the column strength of the frame standoff member.

With a more typical prior art construction, such as that disclosed, in U.S. Pat. No. 5,000,509 the space between the inner rocker panel and the outboard face of the frame rail or other facing structure must first be closed by plastic deformation of the sheet metal bridging between these two structures. This sheet metal is usually flat and comprises a portion of the floorpan. As a result, the sheet metal is unable to absorb significant energy and in any event the magnitude of the intrusion is reduced little by the sheet metal. The present invention provides much greater energy absorption during the bodyside deformation by providing the capability for column resistance to deformation, rather than the mere bending of sections of sheet metal.

SUMMARY OF INVENTION

According to one aspect of the present invention, an automotive body and chassis includes an outer rocker panel and an inner rocker panel joined to said outer rocker panel, with a closure structure having a portion overlying and extending outboard from said outer rocker panel. A frame rail extends longitudinally under the floor pan inboard of the inner rocker panel, with the frame rail having a generally vertical outboard face. A frame standoff member is rigidly attached to the inner rocker panel and extends laterally inboard from the inner rocker panel to the outboard face of said frame rail. The frame standoff member is normally being separated from the outboard face of the frame rail by a clearance gap such that lateral displacement of the closure panel and said outer and inner rocker panels relative to said frame rail resulting from an impact load upon the closure structure will be resisted by the frame standoff member and the frame rail once the clearance gap has been closed.

The frame standoff member preferably includes a structural column having a first end welded to said inner rocker panel. The standoff member may also include an upper flange welded to the floor pan. The configuration of the frame standoff member may include a box-shaped structural column welded at one end to an inner rocker panel.

An automotive body and chassis according to the present invention preferably further includes a frame cross member extending across the body under the floor pan and inboard from said frame rail at a longitudinal position proximate the frame standoff member.

According to another aspect of the present invention, a method for augmenting the capability of an automobile to react to an impact load imposed laterally upon a closure structure of the automobile, includes the steps of reacting to the impact load initially with laterally directed plastic deformation of said closure structure and a rocker panel structure abutting a lower portion of said closure structure, as well as a floor pan extending inboard from said rocker panel structure, and reacting to the load secondarily by means of column compression of a frame standoff member mounted to an inboard portion of the rocker panel structure, with the frame standoff member extending inboard of the rocker panel structure to a longitudinally running frame rail, and with the frame standoff member and the frame rail being separated by a clearance gap which allows the rocker panel structure to be uncoupled from the frame rail during normal operation of the vehicle, such that the frame standoff member is subjected to column compression between the rocker panel structure and the frame rail once the floor pan and the rocker panel structures have deformed sufficiently to cause the clearance gap to close.

It is an advantage of the present invention that the present frame standoff member allows an automotive body to react to higher laterally directed impact loads with greater resistance to deformation, by utilizing the superior bending strength of chassis frame rails, thereby reducing lateral intrusion.

It is a further advantage of the present invention that the enhanced resistance to lateral intrusion offered by the inventive structures will not negatively impact the noise, vibration, and harshness characteristics of an automobile equipped according to this invention.

Other advantages, as well as objects and features of the present invention, will become apparent to the reader of this specification.

DETAILED DESCRIPTION

Figure 1:
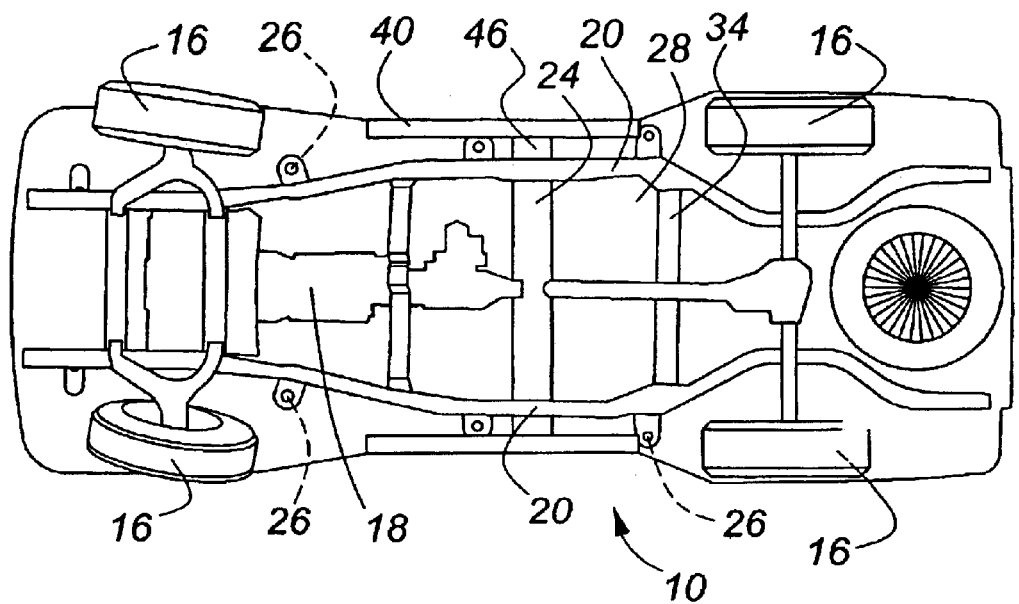
FIG. 1 is plan view of a vehicle having an enhanced lateral intrusion resistance system according to the present invention.

As shown in FIG. 1, vehicle 10 has a plurality road wheels 16 and powertrain 18. Frame rails 20 provide attachment points for the suspension of road wheels 16 and also for the vehicle's body, which comprises a number of components. Thus, the body includes such components as floor pan 28, body cross member 34, and a plurality of elastomeric body mounts 26 which are interposed between the frame of the vehicle, in this case frame rails 20, and portions of floor pan 28. The presence of elastomeric body mounts 26 between the body of the vehicle and frame rails 20 is important for the considerations of the present invention because the elastomeric mounts allow the body to shift to a limited extent with respect to frame rails 20. This shifting is part of an impact energy management sequence which the present invention is intended to modify. Thus, frame stand off member 46 is provided in the vicinity of frame cross member 24 which extends laterally across the vehicle between frame rails 20.

Figure 3:
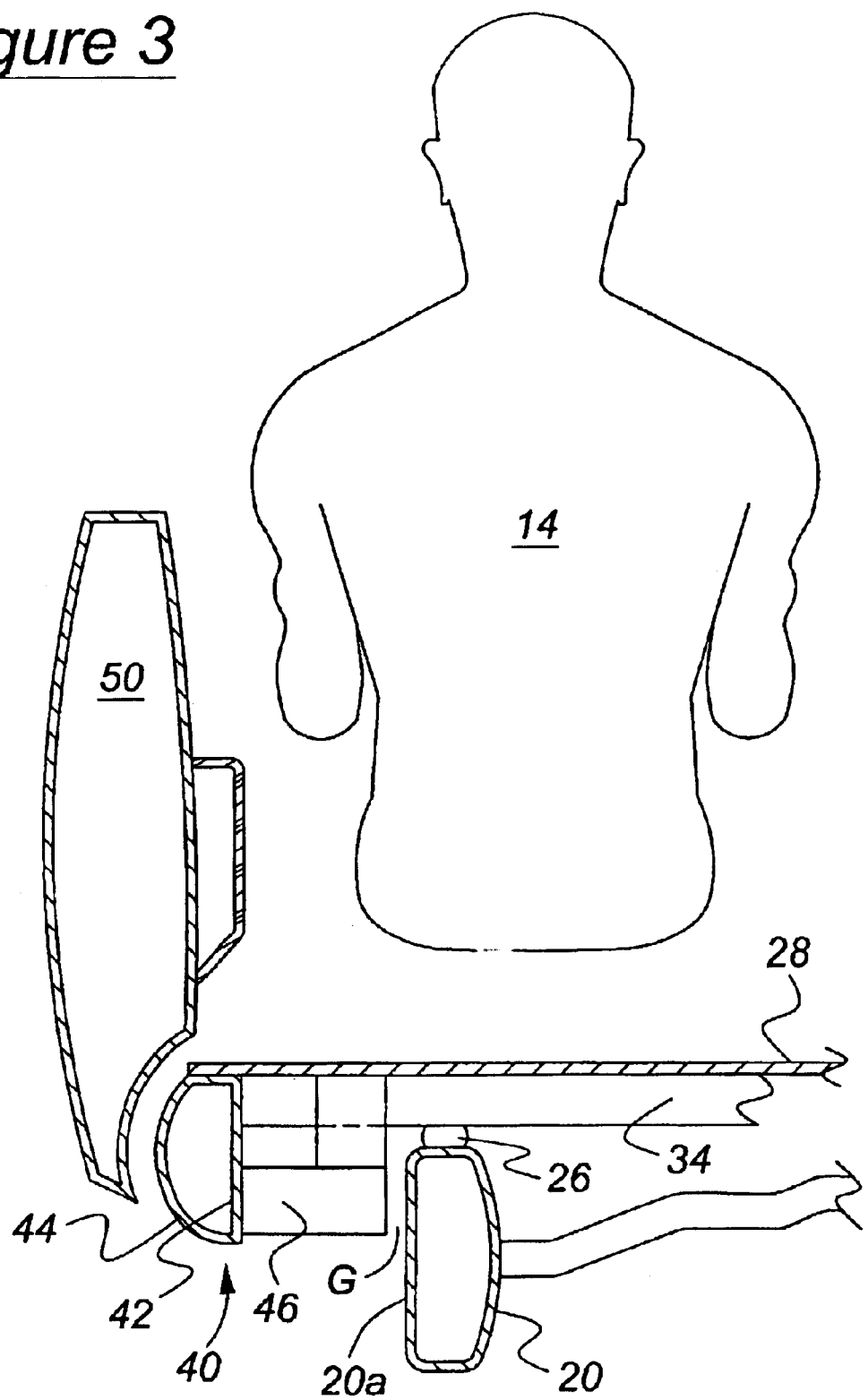
FIG. 3 illustrates various components of a system according to the present invention during normal operation of a vehicle.

FIG. 1 also shows rocker panel structure 40 which, as shown more precisely in FIG. 3, includes inner rocker panel 42 and outer rocker panel 44. FIGS. 1 and 3 also show body cross member 34 and frame cross member 24.

Figure 2:
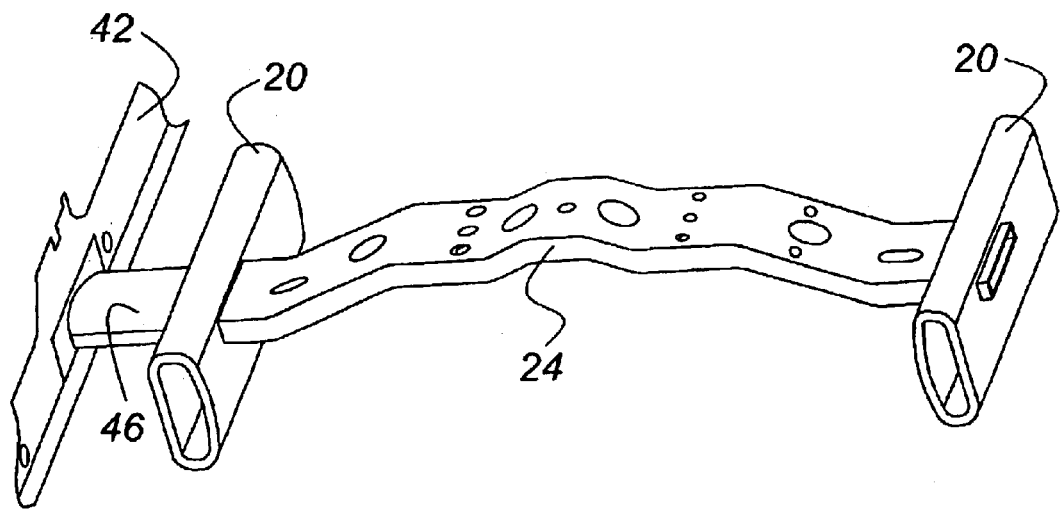
FIG. 2 is a perspective view of a portion of the vehicle shown in FIG. 1.

FIG. 3 is a sectional view, partially in elevation, illustrating more precisely the cooperation of various elements according to the present invention. Thus, door 50, which is drawn from the class of closure structures such as quarter panels or other fixed or movable panels and doors, all of which extend longitudinally along the periphery of a vehicle so as to present a site for a laterally applied impact, overlays and extends outboard from outer rocker panel 44. Frame stand off member 46 is shown as being mounted upon inner rocker panel 42. As shown in FIGS. 1 and 2, frame rails 20 extend longitudinally under floor pan 28 and body cross member 34. Elastomeric body mount 26 is imposed between body cross member 34 and an upper surface of frame rail 20. Body mounts such as mount 26 may also be positioned upon longitudinal body members and upon brackets cantilevered from the frame.

As noted above, frame stand off member 46 is attached to inner rocker panel 42. Stand off member 46 may be comprised of stamped and welded sheet metal, or plastic composites or other types of materials known to those skilled in the art and as suggested by this disclosure. In any event, stand cuff member 46 must have exceptional column strength in order to cause the reduction in side impact related intrusion which characterizes the present invention. Frame stand off member 46 is rigidly attached to inner rocker panel 42 and extends laterally inboard from inner rocker panel 42 to vertical outboard face 20a of frame rail 20. Note that frame stand off member 46 is separated from the outboard face of frame rail 20 by a clearance gap G (FIG. 3). This clearance gap allows frame stand off member 46, as well as rocker panel assembly 40, to be uncoupled from frame rail 20 during normal operation of the vehicle. This means that elastomeric body mounts 26 will be allowed to provide compliance between the body of the vehicle and the frame of the vehicle, which would not otherwise be possible if the body and frame were rigidly mounted, such as would be the case if frame stand off member 46 were itself rigidly mounted to both rocker panel structure 40 and frame rail 20.

The arrangement between frame stand off member 46 and inner rocker panel 42 is shown more clearly in FIG. 2. Thus it is seen that frame stand off member 46 and inner rocker panel 42 may be welded or bonded together, or bolted, or fastened by other means known to those skilled in the arts and suggested by this disclosure.

It is further noted from FIG. 2 that frame rails 20 have frame cross member 24 attached thereto in the approximate location of frame stand off member 46. This allows both of frame rails 20 to be utilized to withstand an impact imposed upon the vehicle laterally. This means that lateral displacement of door 50 and the outer and inner rocker panels 42 and 44 relative to frame rail 20 resulting from an impact load upon door 50 will be resisted by frame stand off member 46, cross member 24, and both of frame rails 20 once clearance gap G (FIG. 3) has been exhausted as a result of the crushing of floor pan 28.

Figure 4:
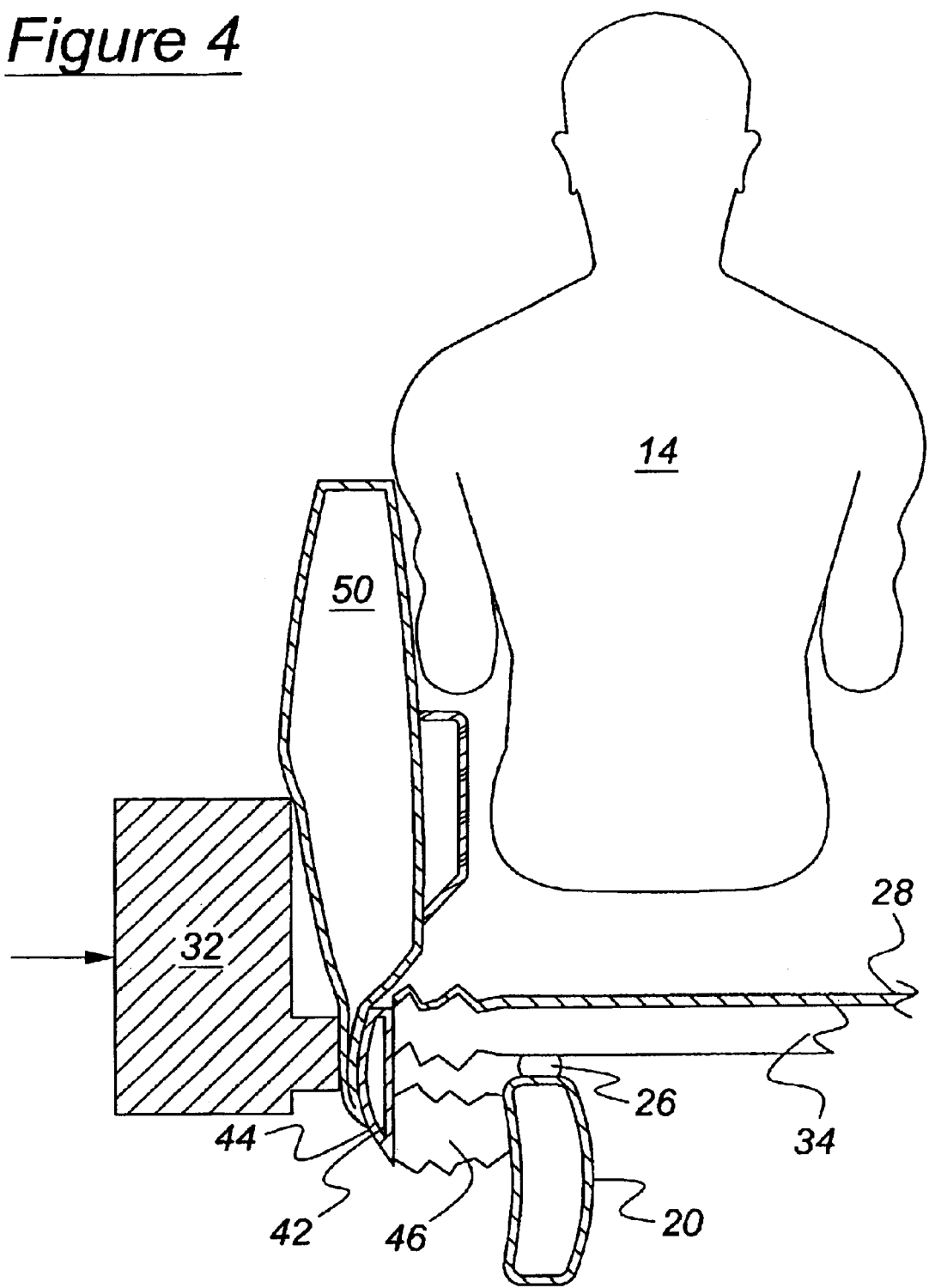
FIG. 4 is similar to FIG. 3, but shows a functional result of implementation of the present intrusion resistance system in the vehicle of FIG. 1.

FIG. 4 illustrates the system of FIG. 3 in a post-impact configuration. Barrier 32 has caused crushing of various body structures. This barrier may comprise for example, an Insurance Institute for Highway Safety barrier. Notice that door 50 and inner and outer rocker panel assemblies 42 and 44 have been crushed; further, it should be noticed that structurally tuned frame stand off member 46, which may be tuned or configured to crush, or not crush, has caused deformation of frame rail 20. It is also noted that floor pan 28 and body cross member 24 have been partially crushed. In performing its role, frame stand off member 46 slows the rate of intrusion of door 50 into the passenger compartment of the vehicle. This beneficial effect is shown graphically in FIG. 5.

Figure 5:
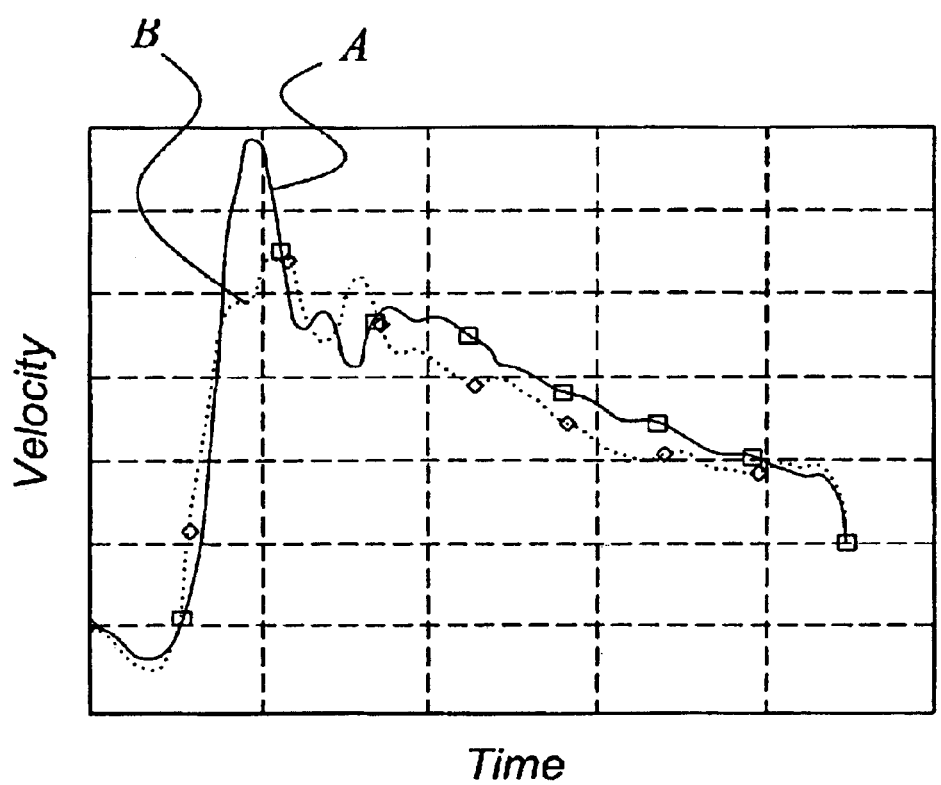
FIG. 5 is a plot illustrating the lateral deformation velocity of a passenger door in a vehicle having a system according to the present invention, as compared with a similar event in a vehicle which is not so equipped.

FIG. 5 is a plot of door intrusion velocity as a function of time. In curve A, which is without benefit of the present frame stand off member and associated structures, the peak velocity of the door intrusion is much greater than for curve B, which includes the effect of the frame stand off member 46. It is thus seen that the intrusion will be much slower, with corresponding presentation of a lesser risk to occupant 14 of vehicle 10.

Those skilled in the art will appreciate in view of this disclosure that component parts such as floor pan 28, cross member 24, inner and outer rocker panels 42 and 44 respectively, and frame stand off member 46 may be formed of metallic and non-metallic materials joined by such processes as riveting, bolting, adhesive bonding, TIG welding, friction welding, fusion welding, spot welding, beam welding, solvent welding and other types of joining processes known to those skilled in the art and suggested by this disclosure. Another alternative for employing a system according to the present invention involves welding of frame stand off member 46 to floor pan 28. The configuration of member 46 in FIG. 3 shows a portion welded to floor pan 28. This provides additional support for stand off member 46.

Although the present invention has been described in connection with particular embodiments thereof, it is to be understood that various modifications, alterations, and adaptations may be made by those skilled in the without departing from the spirit and scope of the invention. It is intended that the invention be limited only by the appended claims.

What is claimed is:

1. An automotive body and chassis, comprising:
    an outer rocker panel;
    an inner rocker panel joined to said outer rocker panel;
    a floor pan joined to said inner rocker panel;
    a closure structure having a portion overlying said outer rocker panel;

a frame rail extending longitudinally under said floor pan inboard of said inner rocker panel, with said frame rail having a generally vertical outboard face; and a frame standoff member rigidly attached to said inner rocker panel and extending laterally inboard from said inner rocker panel to said outboard face of said frame rail, with said frame standoff member normally being separated from said outboard face of said frame rail by a clearance gap such that lateral displacement of said closure panel and said outer and inner rocker panels relative to said frame rail resulting from an impact load upon said closure structure will be resisted by said frame standoff member and said frame rail once said clearance gap has been closed.

2. An automotive body according to claim 1, wherein said frame standoff member comprises a structural column having a first end welded to said inner rocker panel and an upper flange welded to said floor pan.

3. An automotive body according to claim 1, wherein said frame standoff member comprises a box-shaped structural column welded at one end to said inner rocker panel.

4. An automotive body according to claim 1, wherein said frame standoff member comprises a box-shaped structural column bolted at one end to said inner rocker panel.

5. An automotive body according to claim 1, further comprising a frame cross member extending across said body under said floor pan and inboard from said frame rail at a longitudinal position proximate said frame standoff member.

6. An automotive body according to claim 1, wherein said automotive body comprises welded steel.

7. An automotive body according to claim 1, wherein said automotive body comprises a plastic composite.

8. An automotive body according to claim 1, wherein said inner and outer rocker panels, said floor pan, and said frame standoff member each comprise formed metal.

9. An automotive body according to claim 5, wherein said inner and outer rocker panels, said floor pan, and said cross member comprise formed metal, and said frame standoff member comprises molded plastic.

10. An automotive body according to claim 5, wherein said inner and outer rocker panels, said floor pan, and said cross member comprise formed metal and said frame standoff member comprises molded plastic foam.

11. An automotive body according to claim 5, wherein said inner and outer rocker panels, said floor pan, said cross member, and said frame standoff member each comprise a steel stamping.

12. An automotive body according to claim 5, wherein said inner and outer rocker panels, said floor pan, said cross member, and said frame standoff member extension each comprise stamped aluminum.

13. An automotive body according to claim 1, wherein said closure structure comprises a door extending over at least a portion of said outer rocker panel.

14. An automobile having enhanced lateral intrusion resistance, comprising:

a body having an outer rocker panel, an inner rocker panel joined to said outer rocker panel to form a generally tubular rocker panel structure, a floor pan joined to said generally tubular rocker panel structure, a passenger door having a portion overlying and extending outboard from said outer rocker panel;

a frame having a frame rail extending longitudinally under said floor pan inboard of said inner rocker panel, with said frame rail having a generally vertical outboard face and a lateral cross member extending inboard from said frame rail; and a frame standoff member rigidly attached to said inner rocker panel and said floor pan and extending laterally inboard to within a clearance gap of said vertical outboard face of said frame rail, such that lateral displacement of said door and said outer and inner rocker panels and said floor pan relative to said frame rail resulting from an impact load upon said door will be resisted by said frame standoff member, said frame rail, and said lateral cross member once said clearance gap has been exhausted as a result of crushing of said floor pan.

15. A method for augmenting the capability of an automobile to react to an impact load imposed laterally upon a closure structure of the automobile, comprising the steps of:

reacting to said load initially with laterally directed plastic deformation of said closure structure and a rocker panel structure abutting a lower portion of said closure structure, as well as a floor pan extending inboard from said rocker panel structure; and reacting to said load secondarily by means of column compression of a frame standoff member mounted to an inboard portion of said rocker panel structure, with said frame standoff member extending inboard of the rocker panel structure to a longitudinally running frame rail, and with said frame standoff member and said frame rail being separated by a clearance gap which allows the rocker panel structure to be uncoupled from the frame rail during normal operation such that said frame standoff member is subjected to column compression between said rocker panel structure and said frame rail once said floor pan and said rocker panel structure have deformed sufficiently to cause said clearance gap to close.

\* \* \* \* \*